(12) United States Patent
Kita et al.

(10) Patent No.: US 11,591,099 B2
(45) Date of Patent: Feb. 28, 2023

(54) AIRCRAFT PROPULSION SYSTEM

(71) Applicant: HONDA MOTOR CO., LTD., Tokyo (JP)

(72) Inventors: Akinori Kita, Wako (JP); Takeshi Matsumoto, Wako (JP); Daiko Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/539,230

(22) Filed: Dec. 1, 2021

(65) Prior Publication Data

US 2022/0194616 A1     Jun. 23, 2022

(30) Foreign Application Priority Data

Dec. 22, 2020    (JP) .............................. JP2020-212820

(51) Int. Cl.
| | |
|---|---|
| *B64D 31/06* | (2006.01) |
| *B60L 50/61* | (2019.01) |
| *B64C 27/32* | (2006.01) |
| *B64D 27/02* | (2006.01) |

(Continued)

(52) U.S. Cl.
CPC .............. *B64D 31/06* (2013.01); *B60L 50/61* (2019.02); *B64C 27/32* (2013.01); *B64D 27/02* (2013.01); *B64D 27/24* (2013.01); *F02C 9/48* (2013.01); *B60L 2200/10* (2013.01); *F05D 2220/323* (2013.01); *F05D 2220/76* (2013.01); *F05D 2270/093* (2013.01)

(58) Field of Classification Search
CPC ...... B60L 50/61; B60L 2200/10; B64C 27/08; B64C 27/32; B64C 2201/042; B64D 27/02; B64D 27/24; B64D 31/06; B64D 2027/026; B64D 2045/0085; F02C 9/48; F05D 2220/323; F05D 2220/76; F05D 2270/093
See application file for complete search history.

(56) References Cited

U.S. PATENT DOCUMENTS

| | | | | |
|---|---|---|---|---|
| 3,963,372 | A | * | 6/1976 | McLain .................. B64C 27/14 60/39.15 |
| 3,969,890 | A | * | 7/1976 | Nelson ...................... F02C 9/42 377/2 |

(Continued)

FOREIGN PATENT DOCUMENTS

| | | |
|---|---|---|
| CN | 109110137 | 1/2019 |
| EP | 2724939 | 4/2014 |

OTHER PUBLICATIONS

Extended European Search Report for European Patent Application No. 21211028.2 dated May 25, 2022.

*Primary Examiner* — Jason H Duger
(74) *Attorney, Agent, or Firm* — Amin, Turocy & Watson LLP

(57) ABSTRACT

Technology for operating an engine smoothly is provided. In an aircraft propulsion system, a controller causes at least a first engine among the plurality of engines to be stopped and causes a second engine, which has not been stopped, to be operated when an aircraft is flying in a prescribed flight mode and causes the first engine to be operated and causes the second engine to be stopped when a detector detects that the temperature related to the first engine is less than or equal to a first prescribed temperature.

7 Claims, 10 Drawing Sheets

(51) Int. Cl.
*B64D 27/24* (2006.01)
*F02C 9/48* (2006.01)

(56) References Cited

U.S. PATENT DOCUMENTS

| | | | |
|---|---|---|---|
| 5,239,830 A * | 8/1993 | Banthin | F02C 7/32 |
| | | | 60/39.15 |
| 5,363,317 A * | 11/1994 | Rice | B64D 31/12 |
| | | | 701/99 |
| 8,727,271 B2 | 5/2014 | Salyer | |
| 9,493,245 B2 | 11/2016 | Salyer | |
| 10,233,768 B1 | 3/2019 | Watts, III et al. | |
| 2014/0302461 A1* | 10/2014 | Dumur | G09B 9/46 |
| | | | 434/33 |
| 2019/0002115 A1* | 1/2019 | Miller | B64D 31/06 |
| 2020/0148376 A1 | 5/2020 | Kawai | |
| 2020/0347743 A1 | 11/2020 | Long et al. | |

* cited by examiner

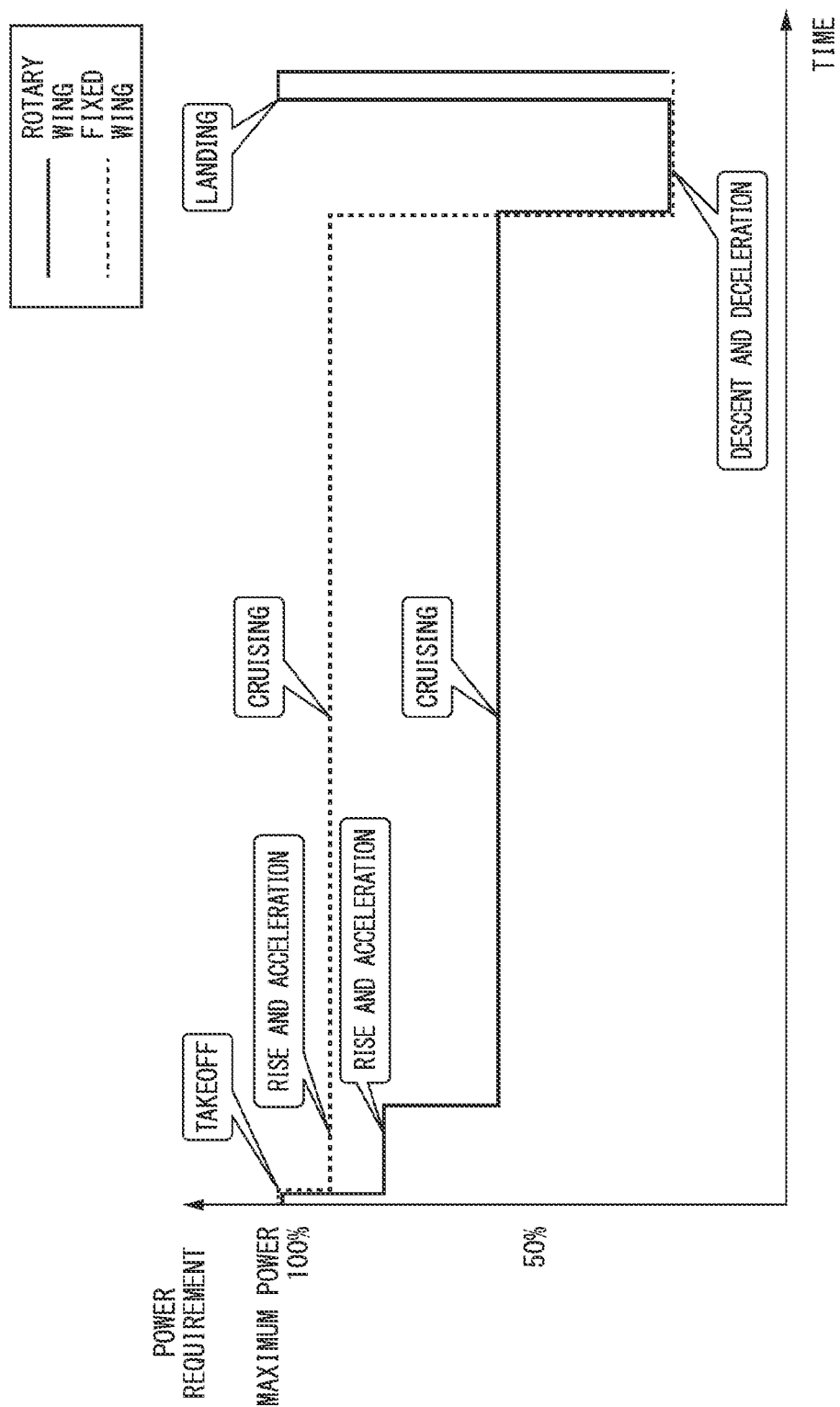

AIRCRAFT PROPULSION SYSTEM

CROSS-REFERENCE TO RELATED APPLICATION

Priority is claimed on Japanese Patent Application No. 2020-212820, filed Dec. 22, 2020, the content of which is incorporated herein by reference.

BACKGROUND OF THE INVENTION

Field of the Invention

The present invention relates to an aircraft propulsion system.

Description of Related Art

Conventionally, there are known aircraft propulsion systems in which a plurality of engines are attached to an aircraft body and a generator is connected to the engines (see, for example, Cited Document 1 (U.S. Pat. No. 8,727,271) and Cited Document 2 (U.S. Pat. No. 9,493,245)). In the aircraft propulsion system, power supplied by a generator and/or power supplied by a battery are supplied to motors and the motors drive a plurality of rotors.

SUMMARY OF THE INVENTION

However, in the above-mentioned aircraft propulsion system, the operation of the engine may not be performed smoothly according to various situations.

The present invention has been made in consideration of the above circumstances and an objective of the present invention is to provide an aircraft propulsion system capable of operating an engine more smoothly.

An aircraft propulsion system according to the present invention has the following configurations.

(1) There is provided an aircraft propulsion system including: a plurality of engines attached to an aircraft body of an aircraft; a generator connected to an engine shaft of the engine; a battery configured to store power generated by the generator; a plurality of motors driven by the power supplied from the generator or the battery; a plurality of rotors attached to the aircraft body of the aircraft and driven by driving forces output from the motors; a detector configured to detect a temperature related to each of the plurality of engines; and a controller configured to control operating states of the plurality of engines, wherein the controller causes at least a first engine among the plurality of engines to be stopped and causes a second engine, which has not been stopped, to be operated when the aircraft is flying in a prescribed flight mode and causes the first engine to be operated and causes the second engine to be stopped when the detector detects that the temperature related to the first engine is less than or equal to a first prescribed temperature.

(2) In the above-described aspect (1), when the detector detects that the temperature of the second engine is less than or equal to a second prescribed temperature after the first engine is operated and the second engine is stopped, the controller may cause the second engine to be operated and cause the first engine to be stopped.

(3) In the above-described aspect (2), the controller may iteratively execute a process of stopping the first engine and operating the second engine when the aircraft is flying in the prescribed flight mode and operating the first engine and stopping the second engine when the detector detects that the temperature related to the first engine is less than or equal to the first prescribed temperature and a process of operating the second engine and stopping the first engine when the detector detects that the temperature of the second engine is less than or equal to the second prescribed temperature after the first engine is operated and the second engine is stopped.

(4) In any one of the above-described aspects (1) to (3), the prescribed flight mode may be a mode in which the controller causes the aircraft to cruise in a direction including a horizontal direction after the aircraft reaches a prescribed altitude.

(5) In the above-described aspect (4), the controller may cause the first engine and the second engine to be operated in a flight mode different from the prescribed flight mode.

(6) In any one of the above-described aspects (1) to (5), the controller may cause an output of the first engine to be increased gradually and cause an output of the second engine to be decreased gradually for a prescribed period when the first engine is operated and the second engine is stopped and cause the output of the first engine to be stopped after the elapse of the prescribed period.

(7) In the above-described aspect (6), the controller may cause the output of the first engine to be increased gradually and cause the output of the second engine to be decreased gradually so that an output obtained by combining the output of the first engine and the output of the second engine is allowed to maintain a required output for the prescribed period and cause the output of the first engine to be approximated to a required output after the elapse of the prescribed period.

According to the aspects (1) to (5), the aircraft propulsion system causes at least the first engine among the plurality of engines to be stopped and causes the second engine, which has not been stopped, to be operated when the aircraft is flying in the prescribed flight mode and causes the first engine to be operated and causes the second engine to be stopped when the detector detects that the temperature related to the first engine is less than or equal to a first prescribed temperature. Thereby, it is possible to operate the engine more smoothly.

According to the aspect (6) or (7), the aircraft propulsion system causes the output of the first engine to be increased gradually and causes the output of the second engine to be decreased gradually for a prescribed period when the first engine is operated and the second engine is stopped and causes the output of the first engine to be stopped after the elapse of the prescribed period. Thereby, it is possible to operate and stop the engine smoothly while maintaining the required output.

BRIEF DESCRIPTION OF THE DRAWINGS

FIG. 10 is a diagram for comparing power required for the flight state of an aircraft having fixed wings with power required for a flight state of an aircraft having rotary wings.

DETAILED DESCRIPTION OF THE INVENTION

Hereinafter, embodiments of an aircraft propulsion system of the present invention will be described with reference to the drawings.

Overall Configuration

Figure 1:
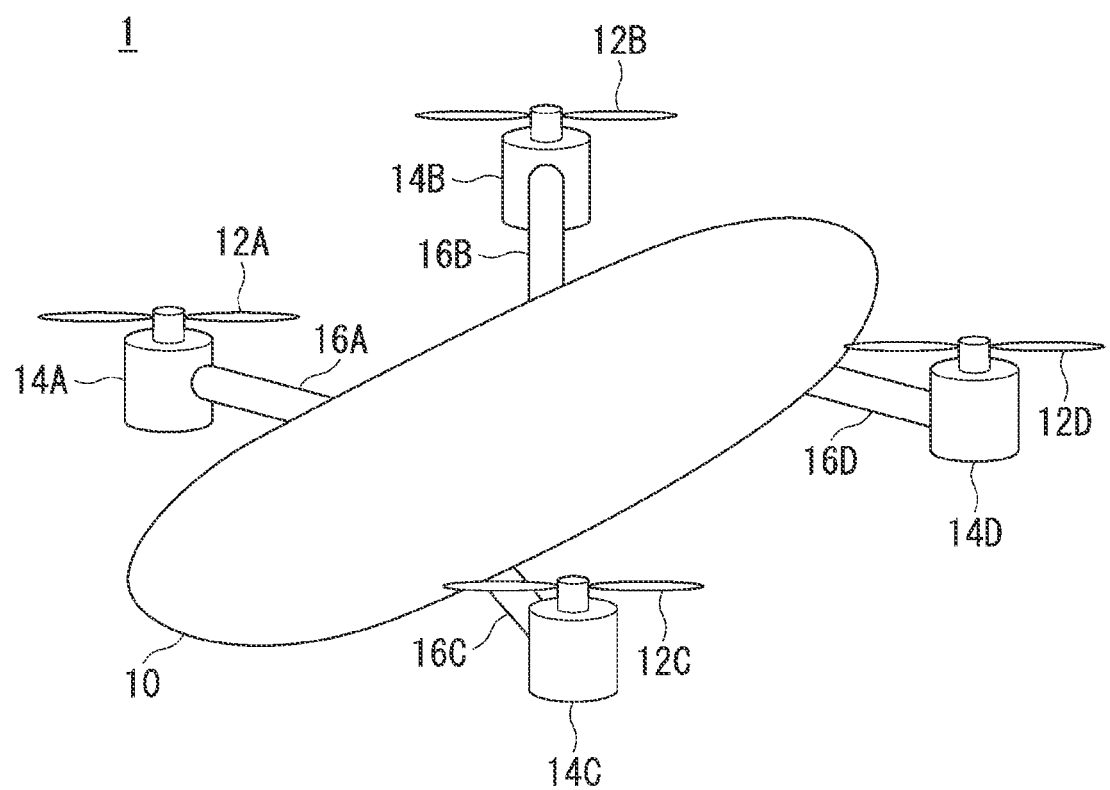
FIG. 1 is a diagram schematically showing an aircraft 1 equipped with an aircraft propulsion system.

FIG. 1 is a diagram schematically showing an aircraft 1 equipped with an aircraft propulsion system. The aircraft 1 includes, for example, an aircraft body 10, a plurality of rotors 12A to 12D, a plurality of motors 14A to 14D, and arms 16A to 16D. Hereinafter, when the plurality of rotors 12A to 12D are not distinguished from each other, they are referred to as rotors 12. Also, when the plurality of motors 14A to 14D are not distinguished from each other, they are referred to as motors 14. The aircraft 1 may be a manned aircraft or an unmanned aircraft. The aircraft 1 is not limited to a multicopter shown in FIG. 1 and may be a helicopter or a compound type aircraft including both rotary wings and fixed wings.

The rotor 12A is attached to the aircraft body 10 via the arm 16A. A motor 14A is attached to a base (a rotating shaft) of the rotor 12A. The motor 14A drives the rotor 12A. The motor 14A is, for example, a brushless direct current (DC) motor. The rotor 12A is a fixed wing of a blade that rotates around an axis parallel to a direction of gravity when the aircraft 1 is in a horizontal attitude. The rotors 12B to 12D, the arms 16B to 16D, and the motors 14B to 14D also have functional configurations as described above and thus the description thereof will be omitted.

By rotating the rotor 12 in accordance with a control signal, the aircraft 1 flies in a desired flight state. The control signal is a signal for controlling the aircraft 1 based on an operation of an operator or an instruction in automatic control. For example, the rotor 12A and the rotor 12D rotate in a first direction (for example, a clockwise direction) and the rotor 12B and the rotor 12C rotate in a second direction (for example, a counterclockwise direction), so that the aircraft 1 flies. In addition to the rotors 12 described above, an auxiliary rotor (not shown) for maintaining an attitude or for horizontal propulsion and the like may be provided.

Figure 2:
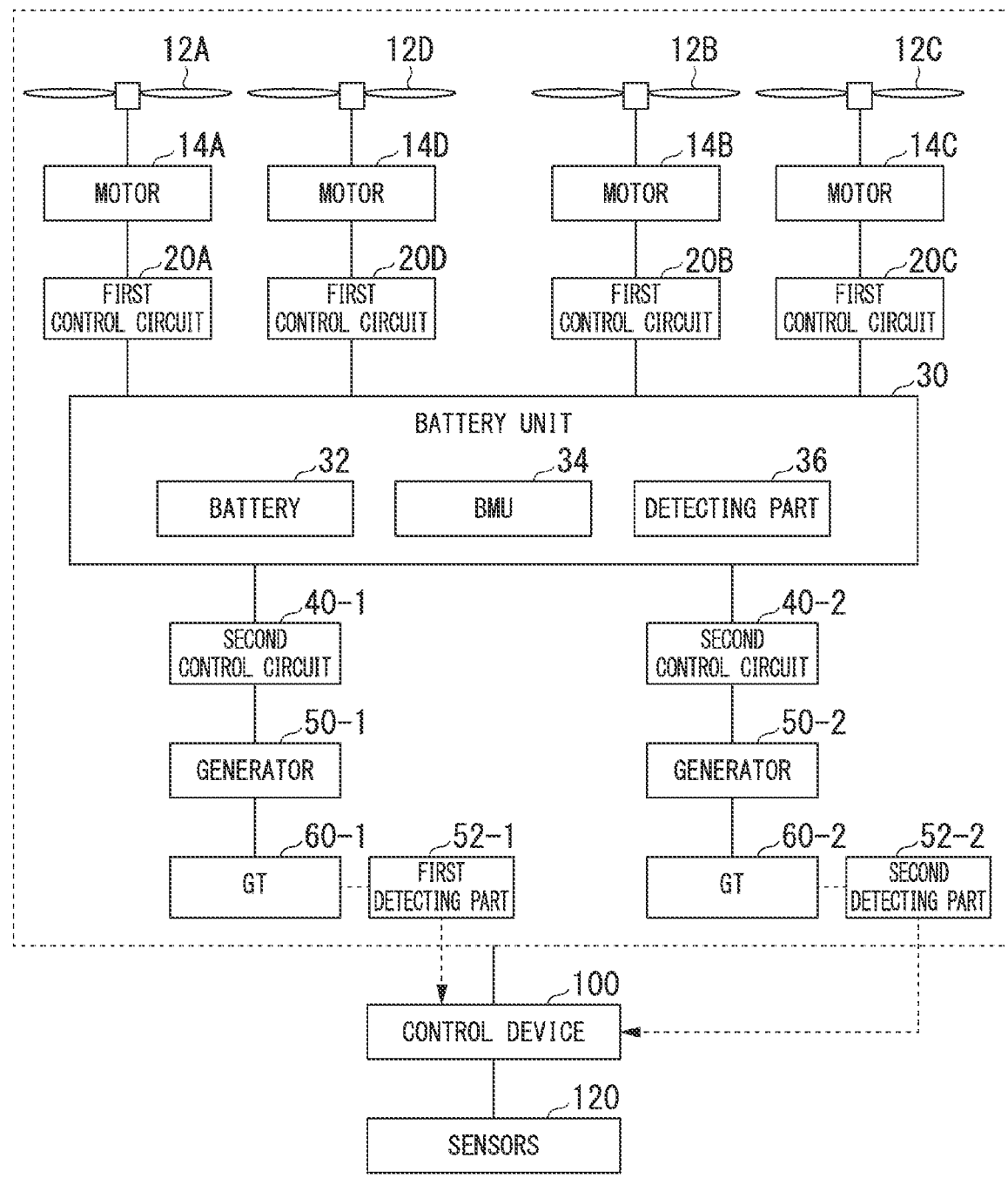
FIG. 2 is a diagram showing an example of a functional configuration of the aircraft 1.

FIG. 2 is a diagram showing an example of a functional configuration of the aircraft 1. In addition to the configuration shown in FIG. 1, the aircraft 1 includes, for example, first control circuits 20A, 20B, 20C, and 20D, a battery unit 30, second control circuits 40-1 and 40-2, generators 50-1 and 50-2, a first detecting part 52-1 (detector in the claims), a second detecting part 52-2 (detector in the claims), and gas turbine engines (hereinafter referred to as "GTs") 60-1 and 60-2. A configuration associated with the number "1" added to the hyphen subsequent to the reference numeral is a first configuration corresponding to the rotor 12A, the rotor 12D, the motor 14A, the motor 14D, the first control circuit 20A, and the first control circuit 20D. A configuration associated with the number "2" added to the hyphen subsequent to the reference numeral is a second configuration corresponding to the rotor 12B, the rotor 12C, the motor 14B, the motor 14C, the first control circuit 20B, and the first control circuit 20C. Hereinafter, the first configuration will be described as a representative. Because the second configuration is similar to the first configuration, the description of the second configuration will be omitted. Hereinafter, when the first detecting part 52-1 and the second detecting part 52-2 are not distinguished, they may be referred to as "detecting parts."

The first control circuit 20A is a power drive unit (PDU) including a drive circuit such as an inverter. The first control circuit 20A supplies the motor 14A with power obtained by converting power supplied by the battery unit 30 according to switching or the like. The first control circuit 20D is a PDU like the first control circuit 20A and supplies power supplied by the battery unit 30 to the motor 14D. The motor 14A causes the rotor 12A to be driven and the motor 14D causes the rotor 12D to be driven.

The battery unit 30 includes, for example, a battery 32, a battery management unit (BMU) 34, and a detector 36. The battery 32 is, for example, an assembled battery in which a plurality of battery cells are connected in series, parallel, or series-parallel. The battery cell constituting the battery 32 is, for example, a secondary battery capable of iterating charging and discharging such as a lithium-ion battery (LIB) or a nickel hydride battery.

The BMU 34 performs the cell balancing, the detection of an abnormality of the battery 32, the derivation of a cell temperature of the battery 32, the derivation of a charge/discharge current of the battery 32, the estimation of a state of charge (SOC) of the battery 32, and the like. The detector 36 includes a voltage sensor, a current sensor, a temperature sensor, and the like for measuring a state of charge of the battery 32. The detector 36 outputs measurement results such as a measured voltage, a measured current, and a measured temperature to the BMU 34.

The aircraft 1 may include a plurality of battery units 30. For example, the battery unit 30 corresponding to each of the first configuration and the second configuration may be provided. Although the power generated by the generator 50 is supplied to the battery 32 in the present embodiment, the present invention is not limited thereto. The power generated by the generator 50 may be supplied to the first control circuit 20 and the motor 14 without involving the battery 32 (or selectively via the battery 32).

The second control circuit 40-1 is a power conditioning unit (PCU) including a converter and the like. The second control circuit 40-1 converts AC power generated by the generator 50-1 into DC power and supplies the converted power to the battery 32 and/or the first control circuit 20.

The generator 50-1 is connected to an output shaft of the GT 60-1. The generator 50-1 is driven by the operation of the GT 60-1 and AC power is generated according to the above driving. The generator 50-1 may be connected to the output shaft of the GT 60-1 via a deceleration mechanism. The generator 50-1 functions as a motor. When the supply of fuel to the GT 60-1 is stopped, the GT 60-1 is allowed to rotate (idle) so that it can be operated. At this time, the second control circuit 40-1 takes out power from the battery 32 side and allows the generator 50-1 to function as the motor. Instead of the above functional configuration, a starter motor may be connected to the output shaft of the GT 60-1 so that the starter motor may be able to operate the GT 60-1.

The detecting part 52 detects a temperature related to the GT 60. The detecting part 52 detects, for example, the temperature of lubricating oil supplied to a bearing of the GT 60 or the like. It is only necessary for the detecting part 52 to acquire information for estimating the temperature of the GT 60.

The GT 60-1 is, for example, a turboshaft engine. The GT 60-1 includes, for example, an intake port (not shown), a compressor, a combustion chamber, a turbine, and the like. The compressor compresses the intake air suctioned from the intake port. The combustion chamber is located downstream of the compressor and burns a gas that is a mixture of compressed air and fuel to generate a combustion gas. The turbine is connected to the compressor and is rotated integrally with the compressor by a force of the combustion gas. The output shaft of the turbine rotates due to the above rotation, so that the generator 50 connected to the output shaft of the turbine operates.

The control device 100 is implemented by, for example, a hardware processor such as a central processing unit (CPU) executing a program (software). Some or all of functions of the control device 100 may be implemented by hardware (including a circuit unit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as a hard disk drive (HDD) or a flash memory of the control device 100 or may be stored in a removable storage medium such as a DVD or CD-ROM and installed in the HDD or the flash memory of the control device 100 when the storage medium (the non-transitory storage medium) is mounted in a drive device.

Various types of sensors 120 include, for example, a rotational speed sensor, a plurality of temperature sensors, a plurality of pressure sensors, an altitude sensor, a gyro sensor, and the like. The rotational speed sensor detects a rotational speed of the turbine. The temperature sensor detects a temperature at a position near the intake port of the GT 60 and/or a temperature at a position immediately downstream of the combustion chamber. The pressure sensor detects a pressure inside a container accommodating the control device 100 and/or a pressure at a position near the intake port of the GT 60. The altitude sensor detects an altitude of the aircraft 1. The gyro sensor detects an attitude of the aircraft body 10.

The control device 100 controls the motor 14, the first control circuit 20, the battery unit 30, the second control circuit 40, the generator 50, the GT 60, and the like, which have been described, based on their operating states, detection results of the detecting part 52, or information acquired from the various types of sensors 120. For example, the control device 100 controls each of the above-described functional configurations so that the aircraft 1 is allowed to take off or land or the aircraft 1 is allowed to fly in a prescribed flight state.

The control device 100 controls the aircraft 1 based on flight information. The flight information is, for example, information obtained from the detection results of the various types of sensors 120 and a flight state of the aircraft 1 based on a control signal. When the flight state of the aircraft 1 is a first state after the plurality of GTs 60 operate and the aircraft 1 takes off, the control device 100 causes at least one GT 60 among a plurality of GTs 60 to be stopped, causes the other GTs 60, which have not been stopped, to be operated in an efficient operating range in which the other GTs 60 can efficiently operate (details thereof will be described below), and causes the generator 50 corresponding to another GT 60 to output power. When the flight state of the aircraft 1 is in a second state different from the first state, the control device 100 controls the aircraft 1 by causing a plurality of GTs 60 to be operated.

Description of Efficient Operating Range

Figure 3:
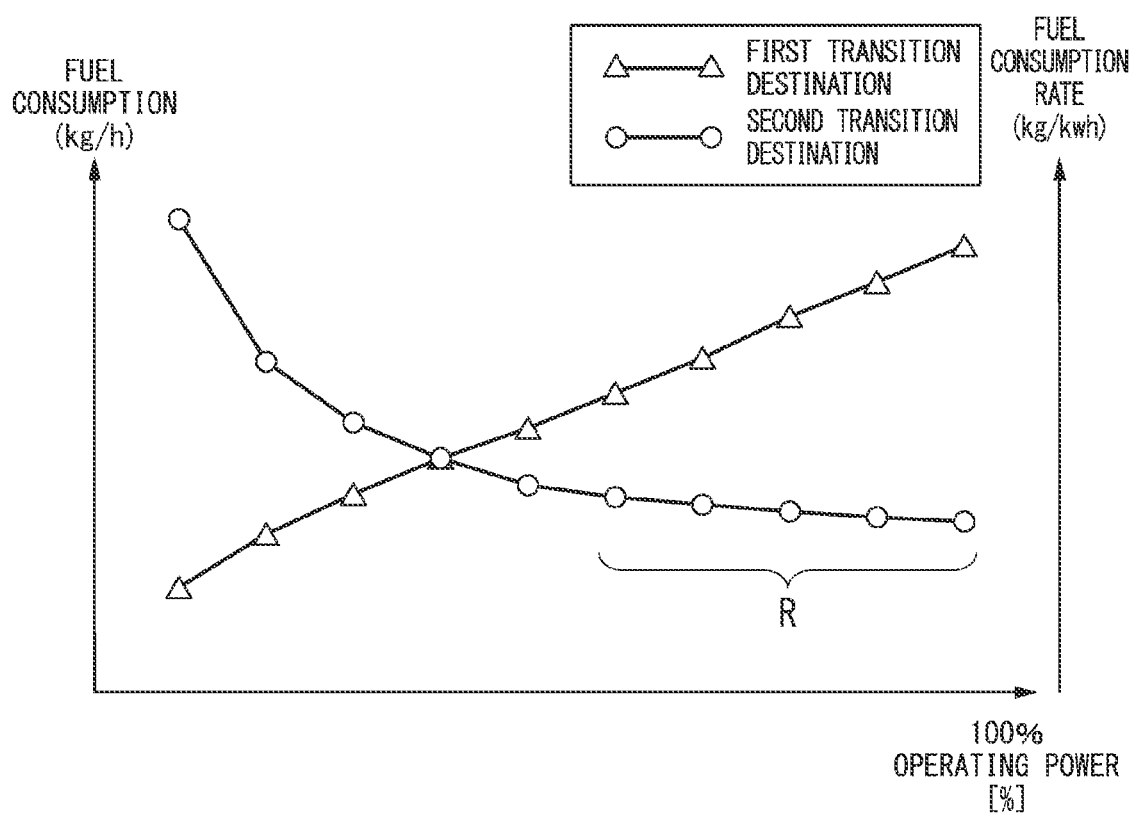
FIG. 3 is a diagram for describing an efficient operating range of a GT 60.

FIG. 3 is a diagram for describing the efficient operating range of the GT 60. FIG. 3 shows a first transition line and a second transition line. The horizontal axis of FIG. 3 shows an output (operating power) [%] of the GT 60. The first transition line shows fuel consumption for each output. Regarding the first transition line, the vertical axis (a first vertical axis on the left side in FIG. 3) represents fuel consumption [kg/h] during a continuous operation for one hour. The first transition line indicates that the efficiency decreases as the slope of the straight line connecting the point of fuel consumption (for example, any point of a mark Δ in FIG. 3) and the origin increases. The first transition line indicates that the efficiency increases as the slope of the straight line connecting the point of fuel consumption (for example, any point of the mark Δ in FIG. 3) and the origin decreases. Although not shown, when the output of the first transition line is zero, the efficiency is offset and becomes a value of zero or more.

The second transition line shows specific fuel consumption (SFC) for each output. Regarding the second transition line, the vertical axis (a second vertical axis on the right side in FIG. 3) represents a fuel consumption rate [kg/kwh]. The SFC indicates a value obtained by dividing the fuel consumption consumed when the GT 60 has continuously operated for one hour by the output and the efficiency increases as the value decreases. The maximum rated power of the GT 60 is shown as 100%.

As indicated by the first transition line and the second transition line, the operating efficiency of the GT 60 decreases as the output of the GT 60 decreases. A maximum efficiency point where the maximum efficiency is high is, for example, a point where the output of the GT 60 is between 95% and 100%. The control device 100 can improve the power generation efficiency by causing the GT 60 to be operated within the efficiency operating range set based on the maximum efficiency point. A range R shown in FIG. 3 is an example of an efficient operating range. The efficient operating range is, for example, a range in which the output starts at around 60% and ends at a value of about 95% to 100%.

The maximum efficiency point or efficient operating range is set for each altitude of the aircraft 1 and each temperature of the GT 60. This information is stored in the storage device of the control device 100. The control device 100 identifies the efficient operating range based on the altitude and the temperature with reference to the information stored in the storage device.

The control device 100 causes at least the GT 60-2 among the plurality of GTs 60 to be stopped and causes the GT 60-1, which has not been stopped, to be operated when the aircraft 1 is flying in a prescribed flight mode (for example, the first state) and causes the GT 60-2 to be operated and causes the GT 60-1 to be stopped when the second detecting part 52-2 detects that a temperature related to the GT 60-2 is less than or equal to a first prescribed temperature. The prescribed flight mode is a mode in which the control device 100 causes the aircraft to cruise in a direction including the horizontal direction after the aircraft 1 takes off and the aircraft 1 reaches a prescribed altitude (see FIG. 4 to be described below).

When the first detecting part 52-1 detects that the temperature related to the GT 60-1 is less than or equal to a second prescribed temperature after the GT 60-2 is operated and the GT 60-1 is stopped, the control device 100 causes the GT 60-1 to be operated and causes the GT 60-2 to be stopped. The first prescribed temperature and the second prescribed temperature may be the same temperature or may be different temperatures.

The control device 100 causes the GT 60-1 and the GT 60-2 to be operated when the flight mode is different from the prescribed flight mode. The flight mode different from the prescribed flight mode is a flight mode in which the aircraft 1 is performing a takeoff or landing operation.

Figure 4:
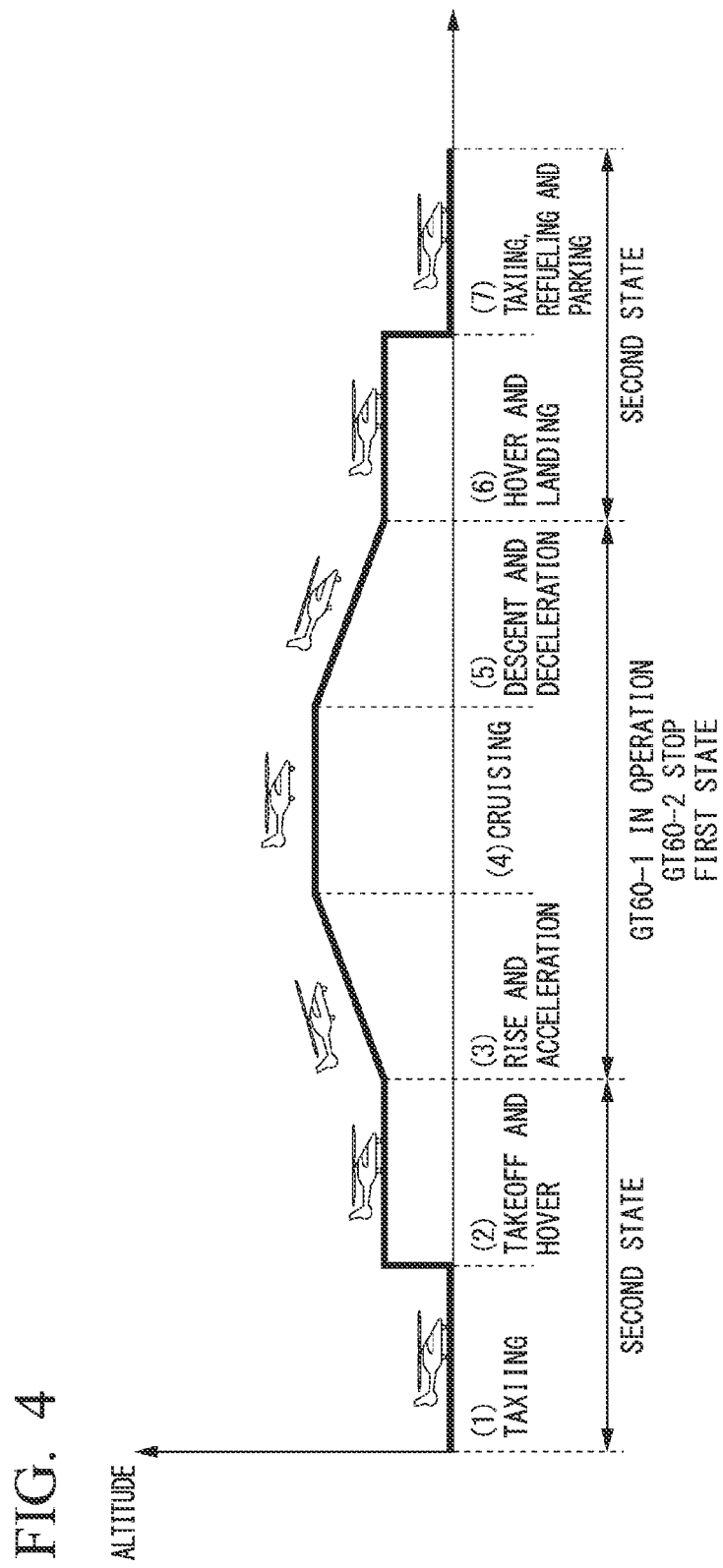
FIG. 4 is a diagram for describing a flight state of the aircraft 1.

FIG. 4 is a diagram for describing the flight state of the aircraft 1. As shown in FIG. 4, the aircraft 1 performs (1) taxiing, (2) takeoff and hover (hovering), (3) rise and acceleration, and (4) cruising. The aircraft 1 performs (5) descent and deceleration, (6) hover and landing, and (7) taxiing, refueling, and parking. A state in which the aircraft 1 moves in a direction including the horizontal direction after reaching a prescribed altitude is the first state. The first state is, for example, a state in which the aircraft 1 shown in FIG. 4 is cruising or a state in which the aircraft 1 shown in FIG. 4 is rising, accelerating, cruising, descending, and decelerating ((3) to (5)). In the following description, the first state is assumed to be a state in which the aircraft 1 is rising and accelerating, cruising, and descending and decelerating. For example, a state in which the aircraft 1 is taking off or landing, taxiing, refueling, and parking ((1), (2), (6), and (7)) is the second state.

For example, when the aircraft 1 is in a takeoff, hovering, or landing state among the above flight states, the control device 100 causes the GT 60-1 and the GT 60-2 to be operated within the efficient operating range. The power output by the GT 60-1 and the GT 60-2 operating within the efficient operating range is power greater than or equal to the required power in the state in which the aircraft 1 is taking off, hovering, or landing or power close to the required power.

In the above flight states, for example, when the aircraft 1 is rising and accelerating, cruising, or descending and decelerating (when the aircraft 1 is in the first state), the control device 100 causes one GT 60 to be operated within the efficient operating range and causes the operation of another GT 60 to be stopped. The power output by one GT 60 operating within the efficient operating range is power greater than or equal to the required power in the state in which the aircraft 1 is rising and accelerating, cruising, or descending and decelerating or power close to the required power. The GT 60-1 and the GT 60-2 have, for example, specifications that satisfy the above-described conditions.

The required power is power required for the aircraft 1 to transition to the flight state based on the control signal or to maintain the flight state. The control device 100 provides the required power to the motor 14 and the motor 14 drives the rotor 12 based on the required power, thereby controlling the aircraft 1 so that the aircraft 1 is in the flight state based on the control signal. The required power required for the first state is, for example, power less than or equal to power that can be output by the generator 50 corresponding to the other GT 60 in a state in which the other GT 60, which has not been stopped, operates in the efficient operating range. The required power required for the first state is power exceeding power that can be output by the other GT 60 described above, but may be power less than or equal to the power that can be supplied by the battery 32. In other words, although the power generated in real time is insufficient, power greater than or equal to the required power is supplied to the motor 14 by supplementing the power from the power prestored in the battery 32. The required power required for the first state can be supplied from the battery 32 when the operations of the GT 60-1 and the GT 60-2 are stopped and the battery 32 is not charged with power.

Flowchart (Process at Time of Takeoff)

Figure 5:
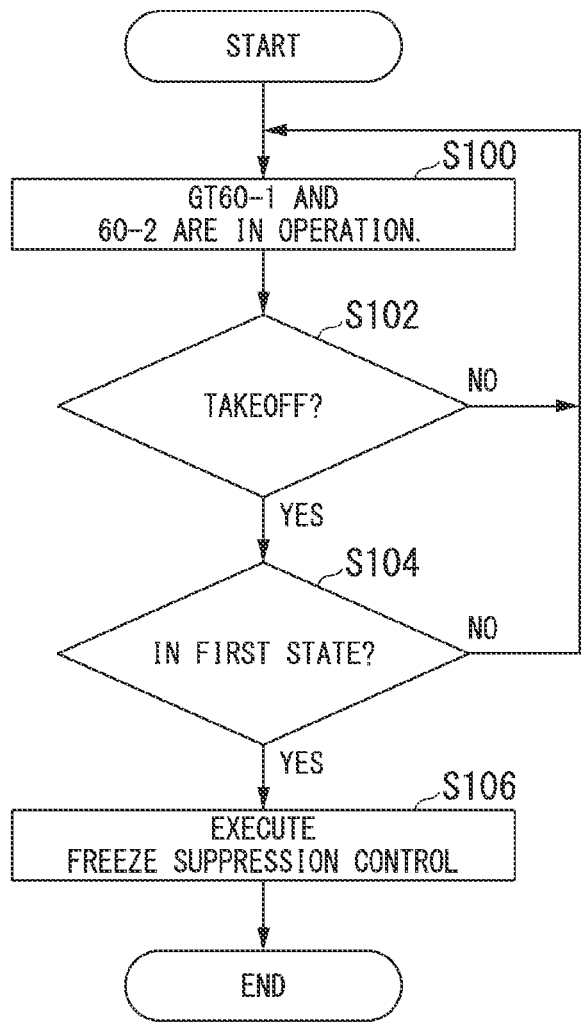
FIG. 5 is a flowchart showing an example of a flow of a process executed by a control device 100.

FIG. 5 is a flowchart showing an example of a flow of a process executed by the control device 100. FIG. 5 is an example of a flow of a process executed at the time of takeoff. First, the control device 100 operates the GT 60-1 and the GT 60-2 (step S100). Next, the control device 100 determines whether or not the aircraft 1 has taken off (whether or not the aircraft 1 is in a takeoff state) (step S102). When the aircraft 1 has not taken off, the process returns to step S100 and a state in which the GT 60-1 and the GT 60-2 are in operation is maintained.

When the aircraft 1 has taken off, the control device 100 determines whether or not the aircraft 1 is in the first state (step S104). In the first state, for example, the GT 60-1 operates within the efficient operating range and therefore power greater than or equal to the required power of the aircraft 1 after takeoff may be able to be supplied.

When the aircraft 1 is in the first state, the control device 100 executes freeze suppression control (step S106). Details of the freeze suppression control will be described below.

Flowchart (Process at the Time of Landing)

Figure 6:
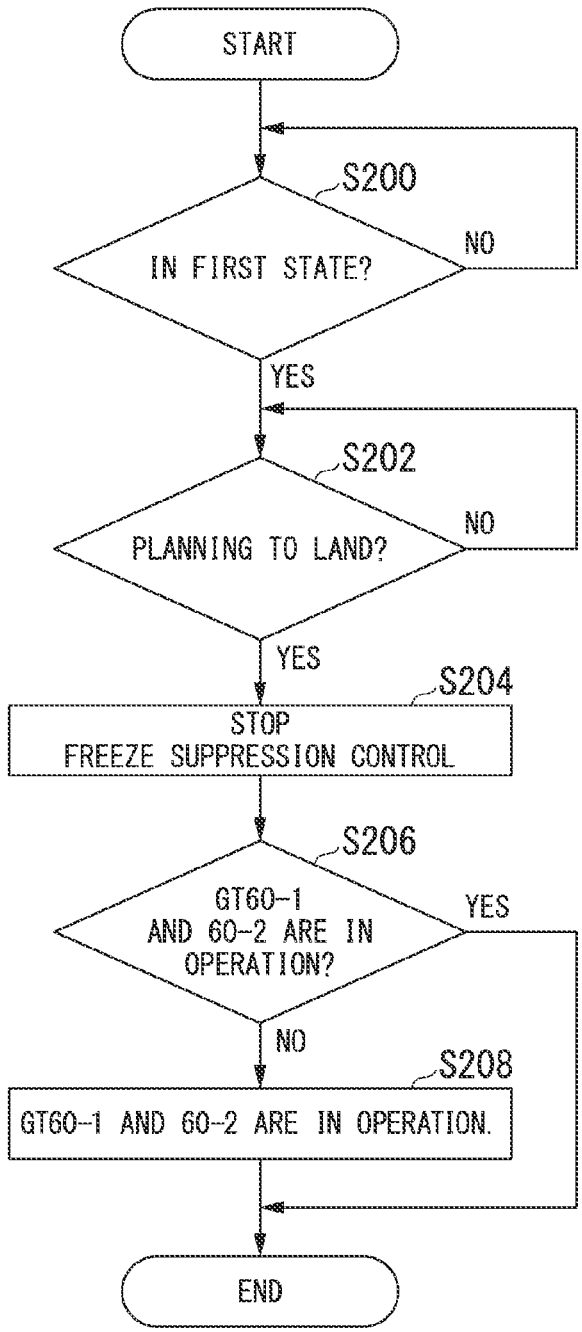
FIG. 6 is a flowchart showing another example of the flow of the process executed by the control device 100.

FIG. 6 is a flowchart showing another example of the flow of the process executed by the control device 100. FIG. 6 is an example of the flow of the process executed at the time of landing. First, the control device 100 determines whether or not the aircraft 1 is in the first state (step S200). When the aircraft 1 is in the first state, the control device 100 determines whether or not the aircraft 1 has been scheduled to land (step S202). For example, when the control device 100 acquires a control signal indicating that the aircraft 1 has been scheduled to land, the control device 100 determines that the aircraft 1 has been scheduled to land.

When the aircraft 1 has been scheduled to land, the control device 100 ends the freeze suppression control (step S204). Next, the control device 100 determines whether or not the GT 60-1 and the GT 60-2 are in operation (step S206). When the GT 60-1 and the GT 60-2 are not in operation, the control device 100 causes the GT 60-1 and the GT 60-2 to be operated (step S208). When the GT 60-1 and the GT 60-2 are in operation, the aircraft 1 lands. Thereby, the process of the present flowchart ends.

As described above, when the aircraft 1 takes off or lands, the control device 100 causes the GT 60-1 and the GT 60-2 to be operated and causes the aircraft 1 to take off or land.

Flowchart (Process Related to Freeze Suppression Control)

Figure 7:
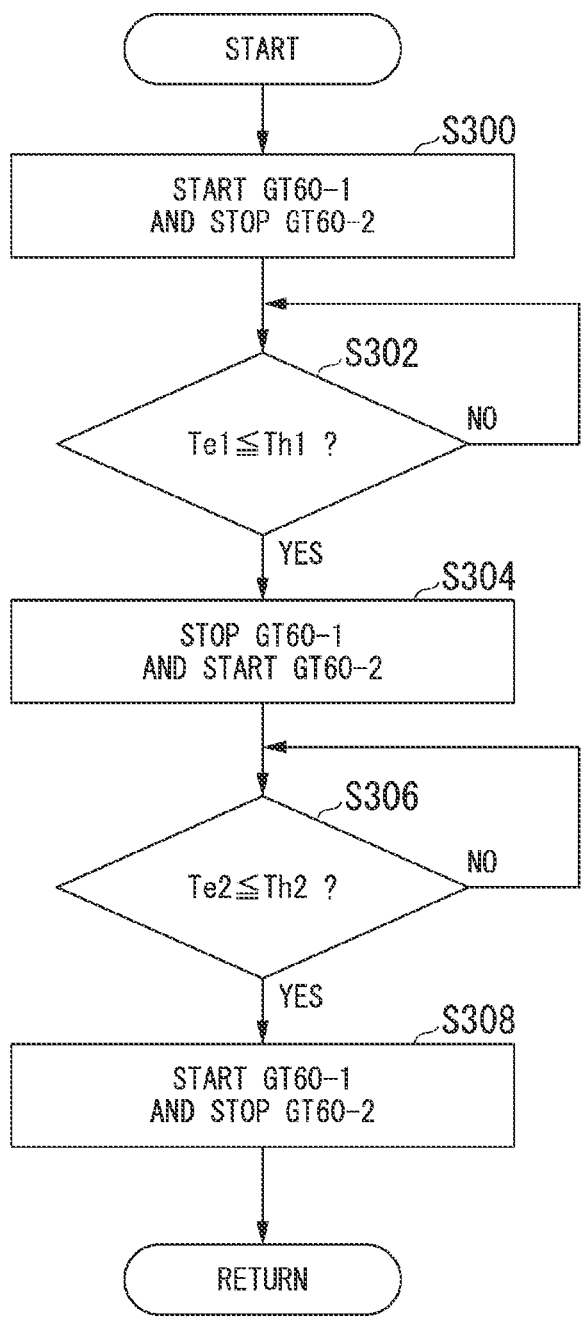
FIG. 7 is a flowchart showing an example of a flow of a process related to freeze suppression control executed by the control device 100.

FIG. 7 is a diagram for describing a flowchart showing an example of a flow of a process related to freeze suppression control executed by the control device 100. When the freeze suppression control has been executed in step S106 of the flowchart of FIG. 5, the control device 100 maintains a state in which the GT 60-1 is operated and causes the GT 60-2 to be stopped (step S300). Next, the control device 100 determines whether or not a temperature Te1 detected by the second detecting part 52-2 is less than or equal to a first prescribed temperature (step S302). When the temperature Te1 is not less than or equal to the first prescribed temperature, the operating state is not changed and the process returns to the previous step (step S300). When the temperature Te1 is less than or equal to the first prescribed temperature, the control device 100 causes the GT 60-1 to be stopped and causes the GT 60-2 to be operated (step S304).

Next, the control device 100 determines whether or not a temperature Te2 detected by the first detecting part 52-1 is less than or equal to a second prescribed temperature (step S306). When the temperature Te2 is not less than or equal to the second prescribed temperature, the operating state is not changed and the process returns to the previous step (step S304). When the temperature Te2 is less than or equal to the second prescribed temperature, the control device 100 causes the GT 60-2 to be stopped and causes the GT 60-1 to be operated (step S308). Thereby, the process of one routine of the present flowchart is completed. As long as the freeze suppression control is continued in step S204 of the flowchart of FIG. 6, the routine of the present flowchart is iterated. When the freeze suppression control ends in step S204 of the flowchart of FIG. 6, the process of the present flowchart ends. Although the case where the GT 60-1 is initially maintained in operation and the GT 60-2 is stopped (step S300) has been described in the present flowchart, the order of the GT 60-1 and the GT 60-2 may be reversed. It is possible to record the final state for the first state of a previous flight (for example, the state in which the GT 60-1 is stopped and the GT 60-2 is operated) as an order determination method and average operation time periods of the GT 60-1 and the GT 60-2 if the process starts from a reverse state thereof (for example, a state in which the GT 60-1 is operated and the GT 60-2 is stopped).

For example, when the aircraft 1 is in the first state, the prescribed GT 60 among the plurality of GTs 60 is operated within the efficient operating range and the other GTs 60 are stopped to improve the power generation efficiency. In this case, if the stopped GT 60 continues in the stopped state, a hydraulic fluid such as the lubricating oil of the GT 60 may freeze or the viscosity may change due to a low temperature in the sky. When the GT 60 is restarted, a starting time period may be longer than usual or the responsiveness of starting may be lowered.

As described above, the aircraft propulsion system causes the GT 60, which has been stopped, to be operated and causes the GT 60 in operation to be stopped when the temperature of the GT 60, which has been stopped, has reached a prescribed temperature. Thereby, the GT 60 can be operated more smoothly and the power generation efficiency can be further improved.

Timing Chart

Figure 8:
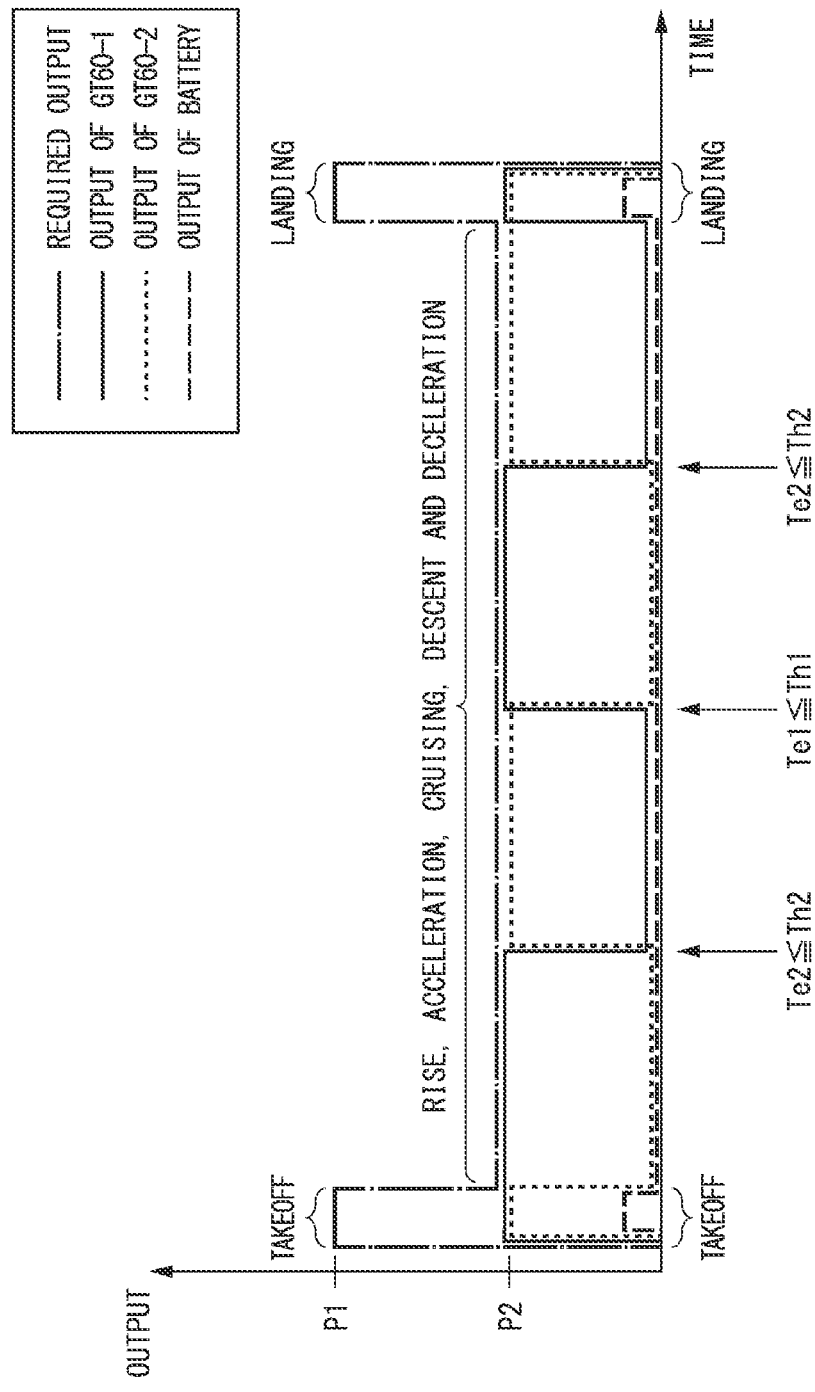
FIG. 8 is a diagram showing an example of changes in an operating state of the GT 60 and a required output (for example, required power) from the time when the aircraft 1 takes off to the time when the aircraft 1 lands.

FIG. 8 is a diagram showing an example of changes in an operating state of the GT 60 and the required output (for example, the required power) from the time when the aircraft 1 takes off to the time when the aircraft 1 lands. The vertical axis of FIG. 8 represents an output (power) and the horizontal axis of FIG. 8 represents time. At the time of takeoff, the control device 100 causes the GT 60-1 and the GT 60-2 to be operated. An output P1 required at the time of takeoff is covered by an output (power) obtained by combining outputs of the GT 60-1 and the GT 60-2 (power of the GT 60-1 and the GT 60-2) and an output (power) of the battery 32. After takeoff, the control device 100 maintains the operation of the GT 60-1 and causes the operation of the GT 60-2 to be stopped. An output P2 required after takeoff is covered by the output from the operation of the GT 60-1 (or the output of the battery 32 when the output is insufficient).

For example, when the temperature related to the GT 60-2 becomes less than or equal to a prescribed temperature, the control device 100 causes the operation of the GT 60-1 to be stopped and causes the GT 60-2 to be operated. Subsequently, when the temperature related to the GT 60-1 becomes less than or equal to the prescribed temperature, the control device 100 causes the operation of the GT 60-2 to be stopped and causes the GT 60-1 to be operated. The control device 100 iterates the above processing steps until the aircraft 1 starts an operation of landing.

At the time of landing, the control device 100 causes the GT 60-1 and the GT 60-2 to be operated. The required output P1 required at the time of landing is covered by power obtained by combining power generated by the GT 60-1 and the GT 60-2 and power supplied by the battery 32.

In the above-described example, surplus power corresponding to an excess output is stored in the battery 32 when the output for operating the GT 60 exceeds the required output and insufficient power is supplemented by the power stored in the battery 32 when power corresponding to an output generated by the operation of the GT 60 is less than the required power.

As described above, the control device 100 controls the GT 60 based on the temperature related to the GT 60. Thereby, the power generation efficiency can be improved and the GT 60 can be operated more smoothly.

Details of Timings Related to Operation and Stopping of GT 60

Figure 9:
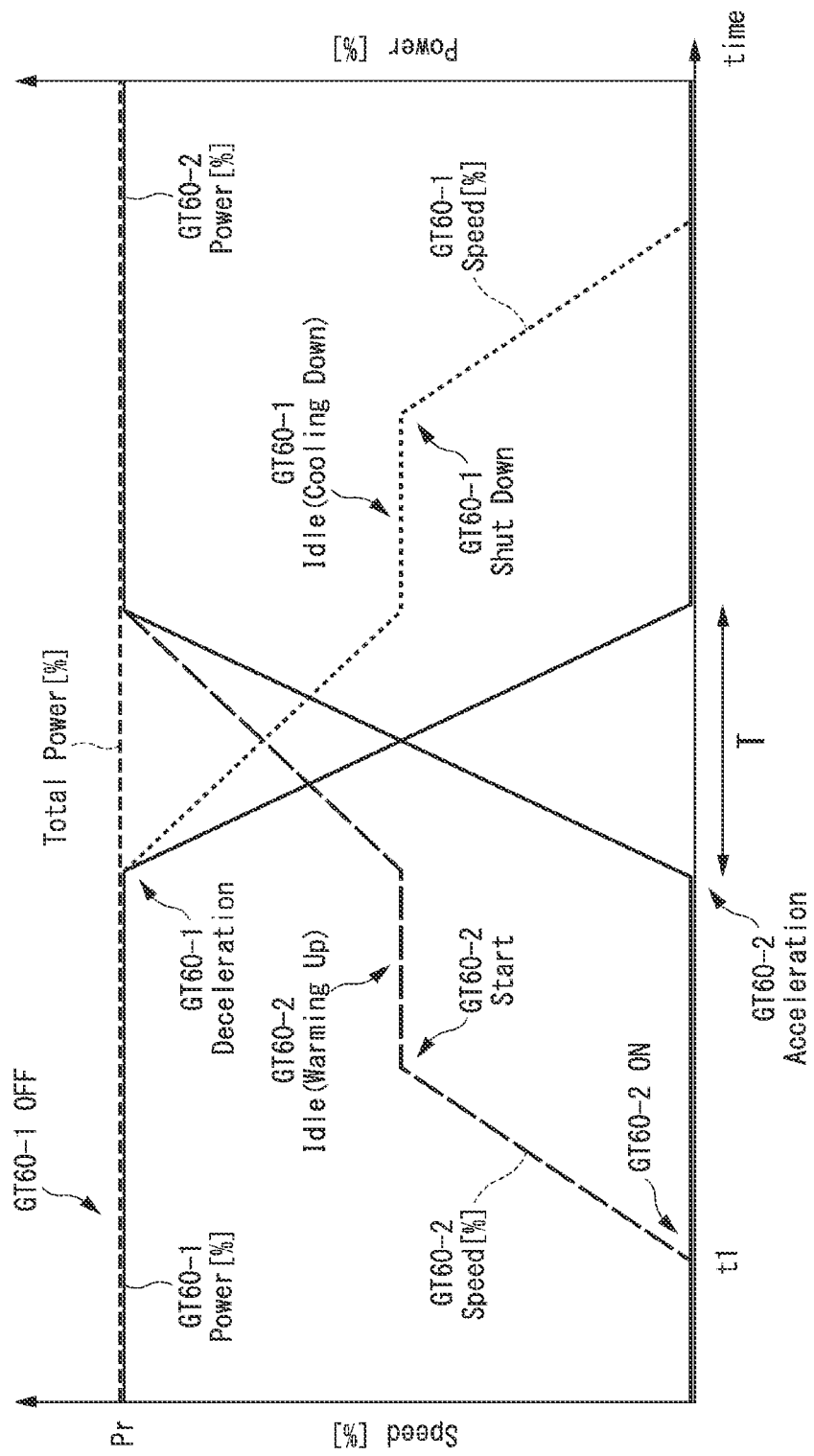
FIG. 9 is a diagram for describing details of timings related to an operation and stopping of the GT 60.

FIG. 9 is a diagram for describing details of timings related to an operation and stopping of the GT 60. The vertical axis of FIG. 9 represents a rotational speed (speed [%]) of the GT 60 or the output (power [%]) of the GT 60. The rated maximum rotational speed and the rated maximum power of the GT 60 are 100%, respectively. The horizontal axis of FIG. 9 represents time.

When the GT 60-2 is operated and the GT 60-1 is stopped, the control device 100 causes the output of the GT 60-2 to be gradually increased and the output of the GT 60-1 to be gradually decreased for a prescribed period T and causes the output of the GT 60-1 to be stopped after the elapse of the prescribed period T. The control device 100 causes the output of the GT 60-2 to be gradually increased and the output of the GT 60-1 to be gradually decreased so that an output obtained by combining the output of the GT 60-1 and the output of the GT 60-2 is allowed to maintain a required output Pr required for the prescribed period T and causes the output of the GT 60-2 to be approximated to the required output Pr after the elapse of the prescribed period T.

When the temperature related to the GT 60-2 becomes less than or equal to a prescribed temperature, the control device 100 causes the control for operating GT 60-2 (for example, operating the starter motor) to be started at time t1. When the GT 60-2 is in a prescribed state, the control device 100 controls the GT 60-2 so that the GT 60-2 is in an idle state and further causes the GT 60-2 to be operated so that the output of the GT 60-2 is increased. Thereby, the output of GT 60-2 gradually increases for the prescribed period T.

At time t1, the control device 100 starts the control for stopping the GT 60-1 and causes the rotational speed and the output of the GT 60-1 to be gradually decreased at the beginning of the prescribed period T. The control device 100 controls the output of the GT 60-1 so that the output of the GT 60-1 is set to zero or to be near zero at the end of the prescribed period T and controls the GT 60-1 so that the GT 60-1 is in an idle state. After the GT 60-1 is controlled in the idle state, the control device 100 causes the rotational speed of the GT 60-1 to be decreased so that the rotational speed of the GT 60-1 is set to zero or to be near zero. For example, the control device 100 controls the GT 60-1 and the GT 60-2 so that the GT 60-1 and the GT 60-2 operate at the output and the rotational speed shown in FIG. 9 with reference to a prescribed map. The prescribed map is, for example, a map in which a temperature, an output, a rotational speed, and a fuel injection amount of the GT 60 are associated with each other.

Here, for example, when an output obtained by combining the output of the GT 60-1 and the output of the GT 60-2 is less than the required output Pr, the aircraft 1 may not be able to maintain a desired flight state. For example, when the output obtained by combining the output of the GT 60-1 and the output of the GT 60-2 is greater than the required output Pr, power (surplus power) corresponding to the output exceeding the required output Pr is supplied to, for example, the battery 32. The surplus power may exceed the power that can be received by the battery 32 or the generation of surplus power may not be suitable for the functional configuration of the aircraft 1.

On the other hand, the control device 100 of the present embodiment controls the GT 60-1 and the GT 60-2 so that the output obtained by combining the output of the GT 60-1 and the output of the GT 60-2 is allowed to maintain the required output Pr for the prescribed period T. Thereby, the GT 60 can be operated and stopped more smoothly.

Comparison Between Aircraft with Fixed Wings and Aircraft with Rotary Wings

FIG. 10 is a diagram for comparing power required for a flight state of an aircraft having fixed wings with power required for a flight state of an aircraft having rotary wings. The vertical axis of FIG. 10 represents an index of power required for a flight and the horizontal axis of FIG. 10 represents time. In the example of FIG. 10, a force required for a flight at the time of takeoff is set to 100. For example, when the aircraft 1 has two GTs 60, the power output by the two GTs 60 at nearly 100% is set to 100.

In the fixed-wing aircraft, a difference between a force required for a flight at the time of takeoff and a force required for a flight at the time of cruising is small and a force required for a flight at the time of cruising is slightly less than 100. On the other hand, in the rotary-wing aircraft, a force required for a flight at the time of takeoff or landing is close to 100, but a force required for a flight at the time of cruising is about 50.

In this way, although the aircraft 1 with rotary wings requires a force of nearly 100 for a flight of a short time period of takeoff and landing, a force of about 50 is required for a flight, for example, for a relatively long time period of cruising. Thus, at the time of cruising, it is necessary to perform more appropriate power management by managing the operation of the GT 60 properly.

In the present embodiment, the control device 100 can improve the power generation efficiency by, for example, causing one GT 60 to be operated and the other GTs 60 to be stopped at the time of cruising. Further, the control device 100 can cause the GT 60 to be operated more smoothly by operating the GT 60, which has been stopped, in accordance with the temperature of the stopped GT 60. For example, the aircraft propulsion system of the present embodiment can be applied to a fixed-wing aircraft, but is more preferably applied to a rotary-wing aircraft 1.

Although the aircraft propulsion system having two GTs 60 has been described in the embodiment, the aircraft propulsion system may be a system having three or more GTs 60 instead thereof. In this case, when the flight state of the aircraft 1 is the first state after a plurality of GTs 60 operate and the aircraft 1 takes off, the aircraft propulsion system causes a prescribed number of GTs 60 to be operated and causes the operations of other GTs 60 to be stopped so that the power requirement is satisfied. Further, when the temperature of the stopped GT 60 becomes less than or equal to a prescribed temperature, the aircraft propulsion system causes the GT 60 having the prescribed temperature or lower to be operated. The prescribed temperature, which is a threshold value when the aircraft propulsion system has three or more GTs 60, may be changed in accordance with the number of GTs 60. For example, the prescribed temperature, which is a threshold value when the aircraft propulsion system has three or more GTs 60, may be higher than the prescribed temperature, which is the threshold value when the aircraft propulsion system has two GTs 60.

According to the embodiment described above, the control device 100 can cause at least the GT 60-2 among the plurality of GTs 60 to be stopped and cause the GT 60-1, which has not been stopped, to be operated when the aircraft 1 is flying in a prescribed flight mode and cause the GT 60-1 to be operated and cause the GT 60-2 to be stopped when the detecting part 52 detects that the temperature related to the GT 60-2 is less than or equal to the first prescribed temperature. Thereby, the GT 60 can be operated more smoothly.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Aircraft
10 Aircraft body
12 Rotor
14 Motor
16 Arm
20 First control circuit
30 Battery unit
32 Battery
34 Battery management unit (BMU)
36 Detector
40 Second control circuit
50 Generator
52 Detecting part (Detector)

60 Gas turbine engine (GT)
100 Control device
120 Various types of sensors

What is claimed is:

1. An aircraft propulsion system comprising:
a plurality of engines attached to an aircraft body of an aircraft;
a plurality of generators connected to an engine shaft of each of the plurality of engines;
a battery configured to store power generated by the plurality of generators;
a plurality of motors driven by power supplied from the plurality of generators or power supplied from the battery;
a plurality of rotors attached to the aircraft body of the aircraft and driven by driving forces output from the plurality of motors;
a plurality of detectors each configured to detect a temperature of a respective one of the plurality of engines; and
a controller configured to control operating states of the plurality of engines,
wherein, in a case where the aircraft is flying in a prescribed flight mode, the controller is configured to cause at least a first engine among the plurality of engines to be stopped and a second engine among the plurality of engines, which has not been stopped, to be operated, and
wherein, in a case where it is detected by a first detector of the first engine, of the plurality of detectors, that the temperature of the first engine is less than or equal to a first defined temperature, the controller is configured to cause the first engine to be operated and the second engine to be stopped.

2. The aircraft propulsion system according to claim 1, wherein, in a case, after the first engine is operated and the second engine is stopped, where a second detector of the second engine, of the plurality of detectors, detects that the temperature of the second engine is less than or equal to a second defined temperature, the controller is configured to cause the second engine to be operated and the first engine to be stopped.

3. The aircraft propulsion system according to claim 2, wherein, in a case where the aircraft is flying in the prescribed flight mode and operating the first engine and stopping the second engine, and where the first detector of the first engine detects that the temperature of the first engine is less than or equal to the first defined temperature, the controller is configured to iteratively execute a first process of stopping the first engine and operating the second engine, and
wherein, in a case where the second detector of the second engine detects that the temperature of the second engine is less than or equal to the second defined temperature after the first engine is operated and the second engine is stopped, the controller is configured to iteratively execute a second process of operating the second engine and stopping the first engine.

4. The aircraft propulsion system according to claim 1, wherein the prescribed flight mode is a mode in which the controller causes the aircraft, after the aircraft reaches a defined altitude, to cruise in a direction comprising a horizontal direction.

5. The aircraft propulsion system according to claim 4, wherein the controller is configured to cause the first engine and the second engine to be operated in a flight mode different from the prescribed flight mode.

6. The aircraft propulsion system according to claim 1, wherein, in a case where the first engine is to be operated and the second engine is to be stopped, the controller is configured to cause an output of the first engine to be increased gradually and an output of the second engine to be decreased gradually for a prescribed period, and wherein, after the elapse of the prescribed period, the controller is further configured to cause the output of the first engine to be stopped.

7. The aircraft propulsion system according to claim 6, wherein the controller is configured to cause the output of the first engine to be increased gradually and the output of the second engine to be decreased gradually so that a combined output, obtained by combining the output of the first engine and the output of the second engine, satisfies a required output for the prescribed period, and wherein, after the elapse of the prescribed period, the controller is further configured to cause the output of the first engine to be approximated to a required output.

* * * * *